United States Patent
Kakeda

(10) Patent No.: US 12,450,739 B2
(45) Date of Patent: Oct. 21, 2025

(54) SYSTEM, METHOD, AND NON-TRANSITORY COMPUTER-READABLE RECORDING MEDIUM FOR EVALUATING STEM CELL DIFFERENTIATION

(71) Applicant: Evident Corporation, Nagano (JP)

(72) Inventor: Takatoshi Kakeda, Nagano (JP)

(73) Assignee: Evident Corporation, Nagano (JP)

( * ) Notice: Subject to any disclaimer, the term of this patent is extended or adjusted under 35 U.S.C. 154(b) by 382 days.

(21) Appl. No.: 18/083,725

(22) Filed: Dec. 19, 2022

(65) Prior Publication Data

US 2023/0123767 A1    Apr. 20, 2023

Related U.S. Application Data

(63) Continuation of application No. PCT/JP2020/032191, filed on Aug. 26, 2020.

(51) Int. Cl.
G06T 7/00 (2017.01)
C12M 1/34 (2006.01)
H04N 5/262 (2006.01)
G06N 20/00 (2019.01)
G06T 3/4046 (2024.01)

(52) U.S. Cl.
CPC ........... *G06T 7/0012* (2013.01); *C12M 41/46* (2013.01); *H04N 5/262* (2013.01); *G06N 20/00* (2019.01);
(Continued)

(58) Field of Classification Search
None
See application file for complete search history.

(56) References Cited

U.S. PATENT DOCUMENTS 10,633,421 B2 * 4/2020 Guay ................... C07K 14/001
2012/0092478 A1 * 4/2012 Honda .................. C12M 41/46
382/133

(Continued)

FOREIGN PATENT DOCUMENTS

JP    2013-236563 A    11/2013
JP    2018124733 A    8/2018

(Continued)

OTHER PUBLICATIONS

Japanese Office Action dated Nov. 14, 2023 received in 20222-544970.

(Continued)

*Primary Examiner* — Haris Sabah
(74) *Attorney, Agent, or Firm* — Scully, Scott, Murphy & Presser, P.C.

(57) ABSTRACT

A system for evaluating stem cell differentiation includes a storage configured to store a machine learned model that has learned success or failure of cell differentiation for a combination of a stem cell and a differentiation induction method, an acquisition unit configured to acquire a target cell image that is an image of a target cell that is a stem cell to be induced to differentiate and differentiation induction information that is information related to a differentiation induction method applied to the target cell, and a processor configured to output differentiation success or failure information indicating an inference result related to success or failure of differentiation of the target cell into a desired cell type on the basis of the target cell image, the differentiation induction information, and the machine learned model. The differentiation induction information includes information indicating the type of a stimulus given to the target cell.

19 Claims, 18 Drawing Sheets

(52) U.S. Cl.
CPC .. *G06T 3/4046* (2013.01); *G06T 2207/10056* (2013.01); *G06T 2207/20081* (2013.01); *G06T 2207/30024* (2013.01)

(56) References Cited

U.S. PATENT DOCUMENTS

| | | | |
|---|---|---|---|
| 2015/0044187 A1* | 2/2015 | Visel | G01N 33/5014 435/7.1 |
| 2017/0081628 A1* | 3/2017 | Matsubara | C12M 41/46 |
| 2018/0127727 A1* | 5/2018 | Yoshida | C12N 5/0696 |
| 2018/0218212 A1 | 8/2018 | Yoshikawa et al. | |
| 2021/0201929 A1 | 7/2021 | Uesaka | |

FOREIGN PATENT DOCUMENTS

| | | | |
|---|---|---|---|
| JP | 2020088263 A | 6/2020 | |
| WO | 2018101004 A1 | 6/2018 | |
| WO | 2019230065 A1 | 12/2019 | |

OTHER PUBLICATIONS

International Search Report dated Oct. 27, 2020 issued in PCT/JP2020/032191.
Japanese Final Office Action dated Jul. 9, 2024 received in 2022-544970.
Japanese Office Action dated Mar. 5, 2023 received in 2022-544970.
Japanese Office Action dated Mar. 5, 2024 received in 2022-544970.

* cited by examiner

SYSTEM, METHOD, AND NON-TRANSITORY COMPUTER-READABLE RECORDING MEDIUM FOR EVALUATING STEM CELL DIFFERENTIATION

CROSS REFERENCE TO RELATED APPLICATIONS

This is a Continuation Application of PCT Application No. PCT/JP2020/032191, filed Aug. 26, 2020, which was not published under PCT Article 21(2) in English.

TECHNICAL FIELD

The present disclosure relates to a system, a method, and a recording medium for evaluating stem cell differentiation.

BACKGROUND

In recent years, stem cells having great potential in applications of regenerative medicine, disease analysis, and the like have attracted attention. Stem cells are cells having self-renewal potency and differentiation potency, and there are various types such as embryonic stem cells (ES cells), induced pluripotent stem cells (iPS cells), and somatic stem cells. Among them, iPS cells that can be artificially produced by genes being added to cells have attracted particularly great attention.

Various techniques related to culturing of a cell including a stem cell have been proposed. For example, WO 2018/101004 proposes a technique for predicting a future state of a cell from an image of the cell being cultured.

SUMMARY

A system according to an aspect of the present invention is a system for evaluating stem cell differentiation, including a storage configured to store a machine learned model that has learned success or failure of cell differentiation for a combination of a stem cell and a differentiation induction method, an acquisition unit configured to acquire a target cell image that is an image of a target cell that is a stem cell to be induced to differentiate and differentiation induction information that is information related to a differentiation induction method applied to the target cell, and a processor configured to output differentiation success or failure information indicating an inference result related to success or failure of differentiation of the target cell into a desired cell type on the basis of the target cell image and the differentiation induction information acquired by the acquisition unit and the machine learned model stored in the storage. The differentiation induction information includes information indicating the type of a stimulus given to the target cell.

A method according to an aspect of the present invention is a method for evaluating stem cell differentiation, including acquiring a target cell image that is an image of a target cell that is a stem cell to be induced to differentiate and differentiation induction information that is information related to a differentiation induction method applied to the target cell, and outputting differentiation success or failure information indicating an inference result related to success or failure of differentiation of the target cell into a desired cell type on the basis of the target cell image and the differentiation induction information that are acquired, and a machine learned model that has learned success or failure of cell differentiation for a combination of a stem cell and a differentiation induction method. The differentiation induction information includes information indicating the type of a stimulus given to the target cell.

A recording medium according an aspect of the present invention is a non-transitory computer-readable recording medium that has recorded a program for causing a computer to perform processing including following processing. The processing includes acquiring a target cell image that is an image of a target cell that is a stem cell to be induced to differentiate and differentiation induction information that is information related to a differentiation induction method applied to the target cell, and outputting differentiation success or failure information indicating an inference result related to success or failure of differentiation of the target cell into a desired cell type on the basis of the target cell image and the differentiation induction information that are acquired, and a machine learned model that has learned success or failure of cell differentiation for a combination of a stem cell and a differentiation induction method, in which the differentiation induction information includes information indicating a type of a stimulus given to the target cell.

BRIEF DESCRIPTION OF THE DRAWING

The present invention will be more apparent from the following detailed description when the accompanying drawings are referenced.

DESCRIPTION OF EMBODIMENTS

Meanwhile, it is known that artificially produced iPS cells are likely to cause individual differences in cells, and cells having low differentiation potency are likely to occur. Also for ES cells, exhibiting similar differentiation potency as in vivo is difficult in vitro. For this reason, in culturing a stem cell, even if a cell is cultured and differentiation of the cell is induced with time being spent and cost being incurred, the cell may not differentiate, and cells having a desired function may not be obtained, and both time and cost are often wasted.

In view of the above circumstances, embodiments of the present invention will be described.

Figure 1:
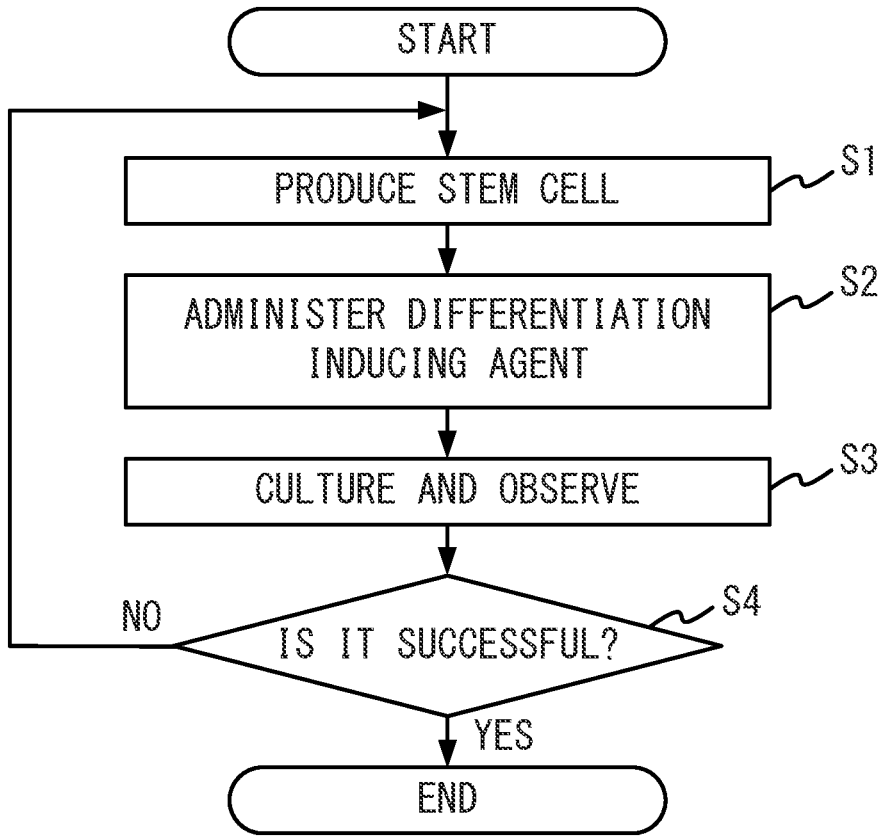
FIG. 1 is an example of a flowchart illustrating a conventional procedure for culturing a stem cell.

FIG. 1 is an example of a flowchart illustrating a conventional procedure for culturing a stem cell. In order to facilitate understanding of the present invention, the conventional procedure for culturing a stem cell will be described before each of the embodiments of the present invention is described.

As illustrated in FIG. 1, in the conventional procedure for culturing a stem cell for obtaining desired cells, first, a stem cell is produced (step S1). For example, in a case of producing an iPS cell as a stem cell, an iPS cell is produced by a somatic cell being collected, genes being introduced into the collected somatic cell to initialize the cell.

Thereafter, a differentiation inducing agent is administered to the produced stem cell (step S2), and the stem cell is observed while the culturing of the stem cell is continued (step S3). By steps S2 and S3 being performed, for example, for several days to several weeks, whether differentiation of the stem cell is successful is revealed. Then, in a case where it is revealed that the differentiation has failed (step S4 NO), the procedure illustrated in FIG. 1 is performed again from the beginning.

As described above, in the conventional procedure for culturing a stem cell, all the procedure illustrated in FIG. 1 is repeatedly performed until the differentiation is successful and a desired amount of desired cells are obtained. Therefore, unless a stem cell having high differentiation potency is stably produced in step S1, the average time required to obtain a desired amount of desired cells is inevitably long.

In each of the embodiments of the present invention, on the premise that the differentiation potency of a produced stem cell varies, culturing a stem cell having a low probability of cell differentiation success is avoided by the level of the differentiation potency of the stem cell being distinguished before differentiation induction. As a result, only a stem cell having a high probability of cell differentiation success are cultured, and thus even in a case where a stem cell having high differentiation potency are not stably produced, the average time required to obtain a desired amount of desired cells can be shorter than that in the conventional procedure.

Each of the embodiments of the present invention will be described below.

First Embodiment

Figure 2:
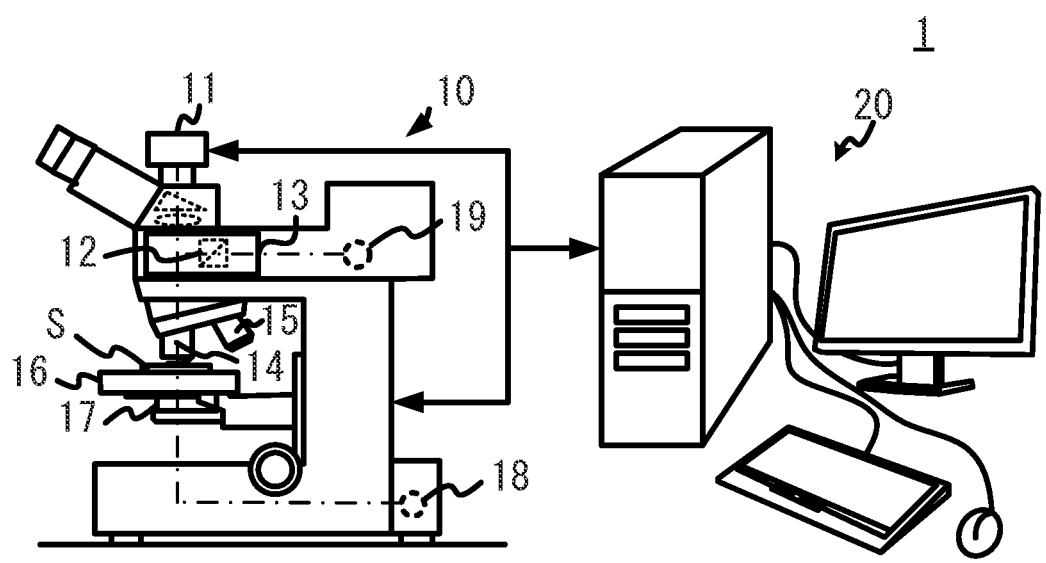
FIG. 2 is a diagram illustrating a configuration of a system according to a first embodiment.
Figure 3:
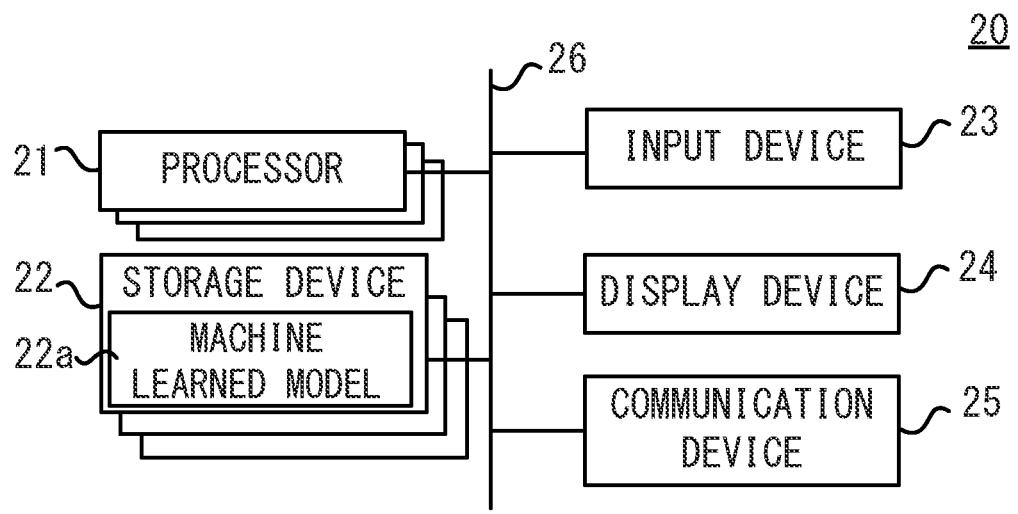
FIG. 3 is a block diagram illustrating a configuration of a computer.

FIG. 2 is a diagram illustrating a configuration of a system 1 according to the present embodiment. FIG. 3 is a block diagram illustrating a configuration of a computer 20. The system 1 is a system for evaluating differentiation of a stem cell having self-renewal potency and differentiation potency.

As illustrated in FIG. 2, the system 1 includes a microscope device 10 that photographs a stem cell and the computer 20 that evaluates differentiation of the stem cell.

In the system 1, using a machine learned model that has learned success or failure of cell differentiation for combinations of a stem cell and a differentiation induction method, the computer 20 infers in advance whether differentiation of a stem cell is successful in a case where culturing of the stem cell is continued on the basis of an image of the stem cell obtained by photographing by the microscope device 10 and a differentiation induction method applied to the stem cell. As a result, useless culturing can be avoided by continuation of cell culturing being stopped in a case where cell differentiation is inferred to fail, and as a result, desired cells can be obtained in a short time and at low cost.

The stem cell evaluated by the system 1 is, for example, an ES cell, an iPS cell, or the like. However, the stem cell is not limited to a pluripotent stem cell such as an ES cell and an iPS cell, and may be a multi-potent stem cell. The multi-potent stem cell is a stem cell in which the direction of differentiation is determined to some extent, and is, for example, a mesenchymal stem cell that is a representative somatic stem cell.

Differentiation induction refers to production of another cell from a stem cell, and the differentiation induction method includes at least a stimulus caused to act on a stem cell, that is, a differentiation inducing factor. The differentiation induction method may further include timing at which a differentiation inducing factor (stimulus) is caused to act. Furthermore, the differentiation induction method may be single processing or a series of processing performed sequentially. The differentiation inducing factor may be a compound, and may be, for example, a liquid factor administered to a culture solution, a gene introduced into a stem cell, or the like. Furthermore, the differentiation inducing factor may be physical stimulus information such as heat, light, or electricity, or may be mechanical stimulus such as pressure or vibration.

The success or failure of differentiation refers to whether differentiation from a stem cell into another cell is successful, and whether the cell after differentiation has differentiation potency does not matter. Therefore, for example, differentiation from an iPS cell into a mesoderm may be interpreted as successful differentiation. Furthermore, differentiation from an iPS cell into a hematopoietic stem cell through a mesoderm may be interpreted as successful differentiation. Furthermore, differentiation from an iPS cell into a blood cell (platelet, red blood cell, white blood cell) through a mesoderm and a hematopoietic stem cell may be interpreted as successful differentiation.

Hereinafter, the configuration of the system 1 will be described with reference to FIGS. 2 and 3. The microscope device 10 is an example of a photographing unit of the system 1 that photographs a stem cell as a sample S. The microscope device 10 photographs a stem cell to be induced to differentiate (also referred to as a target cell) to generate an image of the target cell (hereinafter, referred to as a target cell image). That is, the microscope device 10 photographs a target cell in order to acquire a target cell image.

As illustrated in FIG. 1, the microscope device 10 includes, for example, a digital camera 11, a fluorescence filter cube 12, a turret 13, objectives (phase contrast objective 14, objective 15), a stage 16, a phase contrast condenser 17, and light sources (light source 18, light source 19).

The digital camera 11 includes, for example, an image sensor that converts incident observation light into an electric signal. The image sensor is, for example, a charge coupled device (CCD) image sensor or a complementary metal oxide semiconductor (CMOS) image sensor, and is a two-dimensional image sensor. The digital camera 11 may be a color camera. The digital camera 11 photographs the sample S that is a stem cell and generates a cell image. The cell image generated by the digital camera 11 is output from the digital camera 11 to the computer 20.

The fluorescence filter cube 12 includes, for example, a dichroic mirror, an excitation filter, and an absorption filter. The fluorescence filter cube 12 is arranged in the turret 13 and is insertable into and removable from an optical path. In a case where the microscope device 10 generates a fluorescence image, the fluorescence filter cube 12 is arranged on the optical path. In a case where the microscope device 10 generates a phase contrast image, the fluorescence filter cube 12 is arranged outside the optical path.

The phase contrast objective 14 and the objective 15 are microscope objectives attached to a revolver, and are switched and used according to an observation method. The phase contrast objective 14 is an objective used in a case of generating a phase contrast image. In the phase contrast objective 14, a phase film for giving a phase difference to direct light and diffracted light is provided at a pupil position inside the phase contrast objective 14. The objective 15 is an objective used in a case of generating a fluorescence image.

The sample S is arranged on the stage 16. The stage 16 may be an electric stage or a manual stage. The phase contrast condenser 17 is a condenser used in a case of generating a phase contrast image. The phase contrast condenser 17 includes a ring slit at a position optically conjugate with the phase film provided inside the phase contrast objective 14.

The light source 18 and the light source 19 are, for example, mercury lamps, xenon lamps, light-emitting diode (LED) light sources, or the like. The light source 18 and the light source 19 are switched and used according to an observation method. The light source 18 is a light source used in a case of generating a phase contrast image. The light source 18 illuminates the sample S with light emitted from the light source 18 using a transmitted illumination method. The light source 19 is a light source used in a case of generating a fluorescence image. The light source 19 illuminates the sample S with light emitted from the light source 19 using an epi-illumination method.

The microscope device 10 can generate both a phase contrast image and a fluorescence image as cell images. However, considering that a stem cell to be induced to differentiate then differentiates into other cells and clinically applied, the microscope device 10 desirably photographs the stem cell to be induced to differentiate in a non-stained manner. Therefore, the microscope device 10 desirably generate a phase contrast image that is a non-stained image obtained by photographing a target cell in a non-stained manner as a target cell image. Furthermore, the computer 20 may generate an inferred stained image from the non-stained image generated by the microscope device 10 using a machine learned model for inferring a stained image from a non-stained image.

As illustrated in FIG. 3, the computer 20 includes, for example, one or more processors 21, one or more storage devices 22, an input device 23, a display device 24, and a communication device 25 that are connected via a bus 26.

Each of the one or more processors 21 is a piece of hardware including, for example, a CPU (central processing unit), a GPU (graphics processing unit), and a DSP (digital signal processor) and performs programmed processing by performing a program (not illustrated) stored in the one or more storage devices 22. Further, the one or more processors 21 may include an ASIC (application specific integrated circuit), an FPGA (field-programmable gate array), and the like.

The one or more processors 21 are an example of an inference unit of the system 1. The one or more processors infer success or failure of differentiation of the target cell using a machine learned model 22a stored in a storage device 22, and output an inference result.

Each of the one or more storage devices 22 may include, for example, any one or more of semiconductor memories and also include one or more of other storage devices. The semiconductor memories include, for example, a volatile memory such as a random access memory (RAM), and a nonvolatile memory such as a read only memory (ROM), a programmable ROM, and a flash memory. The RAM may include, for example, a DRAM (dynamic random access memory) and an SRAM (static random access memory). Other storage devices may include, for example, a magnetic storage device including a magnetic disk and an optical storage device including an optical disk.

The one or more storage devices 22 are non-transitory computer-readable media and are an example of a storage unit of the system 1. At least one of the storage devices 22 stores the machine learned model 22a that has learned success or failure of cell differentiation for combinations of a stem cell and a differentiation induction method.

The input device 23 is a device directly operated by a user, and is, for example, a keyboard, a mouse, a touch panel, or the like. The display device 24 is, for example, a liquid crystal display, an organic EL display, a cathode ray tube (CRT) display, or the like. The display may include a built-in touch panel. The communication device 25 is an example of a notification unit of the system 1. The communication device 25 may be a wired communication module or a wireless communication module.

The input device 23 and the communication device 25 are an example of an acquisition unit of the system 1, and acquire a target cell image and differentiation induction information. The differentiation induction information is information related to a differentiation induction method applied to a target cell. The differentiation induction information includes information indicating the type of a stimulus given to a target cell. Furthermore, the differentiation induction information may include information related to timing at which a stimulus is given in addition to the information related to the type of a stimulus. More specifically, information related to a differentiation inducing factor caused to act on a target cell such as information related to the differentiation inducing factor administered to a culture solution in which the target cell is immersed may be included, and information related to timing at which a differentiation inducing factor is caused to act such as timing at which the differentiation inducing factor is administered to a culture solution may be included. This is because success or failure of differentiation and a differentiation destination can be different due to a difference in timing of causing action (for example, day 3, day 6, and the like from the start of culturing) even if the same differentiation inducing factor is caused to act.

Note that the configuration illustrated in FIG. 3 is an example of a hardware configuration of the computer 20. The computer 20 is not limited to this configuration. The computer 20 may be a dedicated device instead of a general-purpose device.

Figure 4:
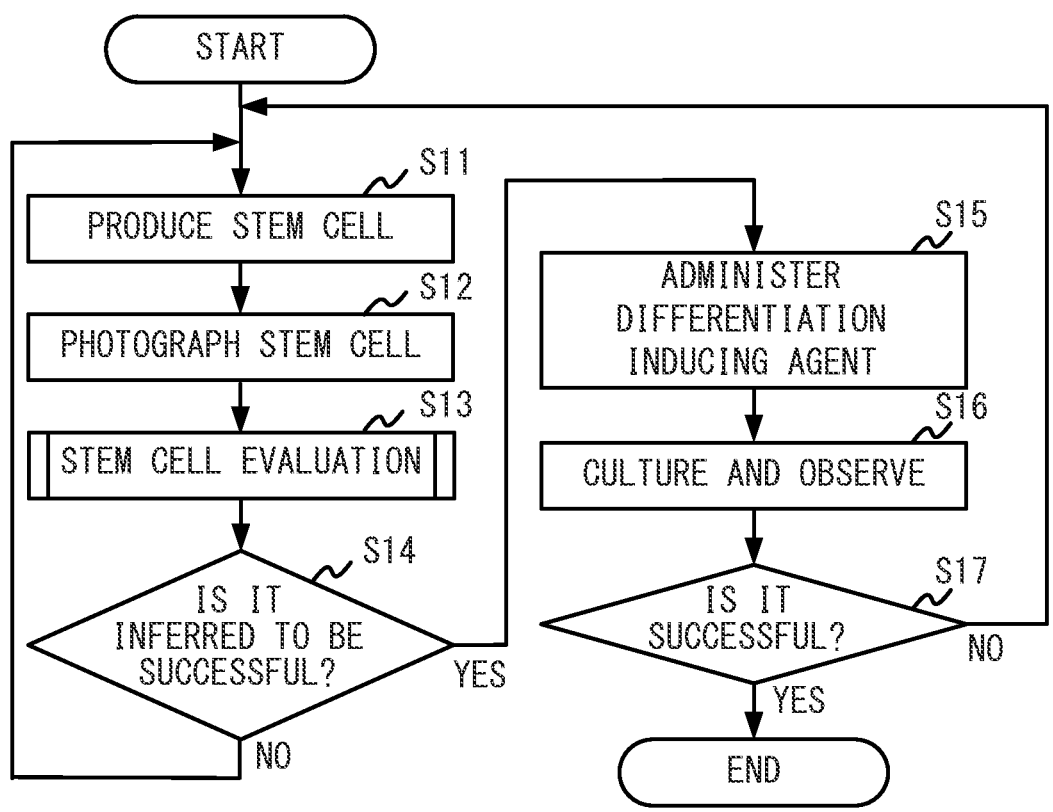
FIG. 4 is an example of a flowchart illustrating a procedure for culturing a stem cell according to the first embodiment.
Figure 5:
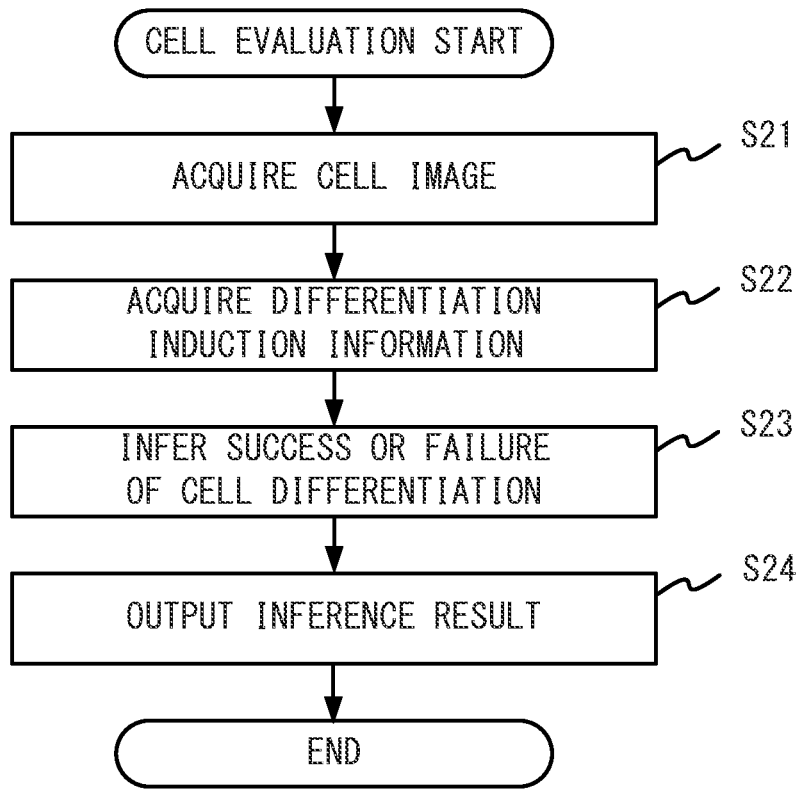
FIG. 5 is an example of a flowchart of stem cell evaluation processing according to the first embodiment.
Figure 6:
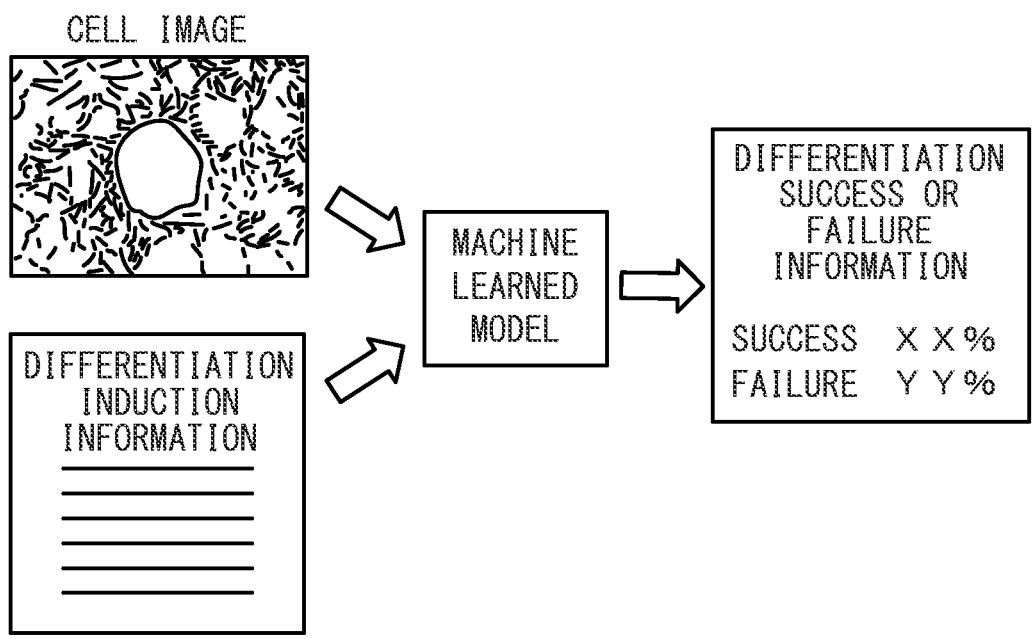
FIG. 6 is a diagram for describing input and output of a machine learned model according to the first embodiment.

FIG. 4 is an example of a flowchart illustrating a procedure for culturing a stem cell according to the present embodiment. FIG. 5 is an example of a flowchart of stem cell evaluation processing according to the present embodiment. FIG. 6 is a diagram for describing input and output of a machine learned model according to the present embodiment. Hereinafter, the procedure for culturing a stem cell performed using the system 1 will be described with reference to FIGS. 4 to 6.

Also in the procedure for culturing a stem cell according to the present embodiment, first, a user of the system 1 produces a stem cell to be induced to differentiate (step S11). This processing is similar to processing in step S1 in the conventional procedure for culturing illustrated in FIG. 1.

Next, the microscope device 10 photographs the stem cell produced in step S11 (step S12). Here, the microscope device 10 photographs the stem cell arranged on the stage 16 using a phase contrast observation method, and generates a target cell image that is a phase contrast image. The microscope device 10 outputs the generated target cell image to the computer 20.

Thereafter, the computer 20 performs stem cell evaluation processing illustrated in FIG. 5 (step S13). Here, the computer 20 first acquires the target cell image generated in step S12 and information related to a differentiation induction method applied to the stem cell produced in step S11 (differentiation induction information) (step S21, step S22). In step S22, for example, information input by the user using the input device 23 may be acquired as the differentiation induction information. The differentiation induction information includes, for example, information related to a differentiation inducing factor and information related to timing at which the differentiation inducing factor is caused to act. The timing information may be information specifying work start timing and a period. Specifically, as an example of a case of differentiation into a nerve cell, the differentiation induction information may be information indicating that a BMP inhibitor is administered for 12 days, and then a TGFbeta/Activin inhibitor is administered for 40 days. Furthermore, as an example of a case of differentiation into a chondrocyte, the differentiation induction information may be information indicating that a WNT and an Acitivin are administered for 3 days, and then a BMP4 is administered for 7 days.

When the target cell image and the differentiation induction information are acquired, the computer 20 infers success or failure of differentiation of the stem cell produced in step S11 (step S23). Here, the computer 20 infers success or failure of differentiation of the stem cell on the basis of the target cell image, the differentiation induction information, and the machine learned model 22a stored in the storage device 22. More specifically, as illustrated in FIG. 6, the computer 20 inputs the target cell image and the differentiation induction information to the machine learned model, thereby acquiring differentiation success or failure information indicating an inference result related to success or failure of differentiation of the target cell by the machine learned model. The differentiation success or failure information may be binary values of differentiation success and differentiation failure, or may be a probability of differentiation success and a probability of differentiation failure as illustrated in FIG. 6. Note that, in a case where a plurality of machine learned models is recorded in the storage device 22, a step for selecting a machine learned model to be used may be included before step S23. Specifically, in a case where the machine learned models are divided according to the type of a stem cell and the type of a differentiation destination, an operator can input conditions of a desired differentiation destination, the type of a stem cell, and the like to the computer 20 and select a desired machine learned model.

Finally, the computer 20 outputs an inference result in step S23 (step S24). Here, the computer 20 outputs the differentiation success or failure information acquired in step S23. Note that the differentiation success or failure information may be output to the storage device 22 and recorded in a file or a database, or may be output to the display device 24 and displayed as an image. Note that, as the inference result to be displayed, not only the inference result in step S23 but also cell type information such as a name of a cell after differentiation or a stage (for example, name such as mesoderm and chondrocyte) may be simultaneously displayed. In this case, learning for names of a cell after differentiation or a stage may be simultaneously performed in a training procedure to be described below. As a result, an operator can more reliably determine success or failure of differentiation of a cell desired by the operator.

When the cell evaluation processing by the computer 20 ends, the user determines whether differentiation is inferred to be successful on the basis of the differentiation success or failure information output in step S24 (step S14). In a case where the differentiation is inferred to fail (step S14 NO), the culturing of the stem cell is stopped at this time point, and the procedure illustrated in FIG. 4 is performed again from the production of a new stem cell.

On the other hand, in a case where the differentiation is inferred to be successful (step S14 YES), the user administers a differentiation inducing agent (differentiation inducing factor) to the stem cell (step S15), and observes the stem cell while continuing the culturing of the stem cell (step S16). Note that processing in steps S15 and S16 is similar to processing in steps S2 and S3 in the conventional procedure for culturing illustrated in FIG. 1. In a case where it is revealed that the differentiation of the stem cell has failed after a lapse of several days to several weeks (step S17 NO), the culturing of the stem cell is stopped, and the procedure illustrated in FIG. 4 is performed again from the production of a new stem cell.

As described above, in the system 1 according to the present embodiment, by the cell evaluation processing illustrated in FIG. 5 being performed before the start of differentiation induction, a stem cell having a low probability of differentiation success, that is, a stem cell having low differentiation potency can be distinguished. Using the differentiation potency of a stem cell inferred by the cell evaluation processing as a criterion for determining whether culturing of the stem cell should be continued, useless culturing in which differentiation fails can be greatly reduced. Therefore, costs related to the useless culturing can be reduced. Furthermore, since culturing of an unpromising stem cell can be stopped and a new stem cell can be produced and evaluated at an early stage, desired cells can be obtained from a stem cell in a shorter time as compared with the conventional procedure. Therefore, according to the system 1, desired cells can be obtained from a stem cell in a short time and at low cost. In particular, in a case where an undifferentiated cell is to be inferred instead of a cell that has advanced to some extent in differentiation, success or failure of culturing can be inferred before the culturing is proceeded to cell differentiation, and whether to continue the culturing can be determined. The cell to be inferred is desirably a cell at an early stage in which differentiation and growth are not proceeded, considering costs of time, labor, and the like required for an operator to culture.

Figure 7:
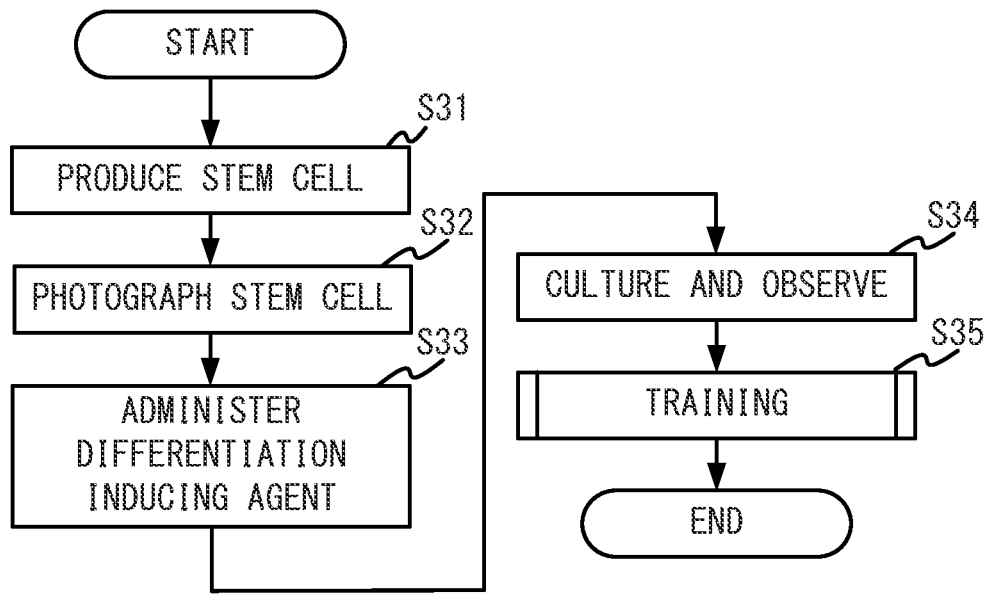
FIG. 7 is an example of a flowchart illustrating a training procedure of the machine learned model according to the first embodiment.
Figure 8:
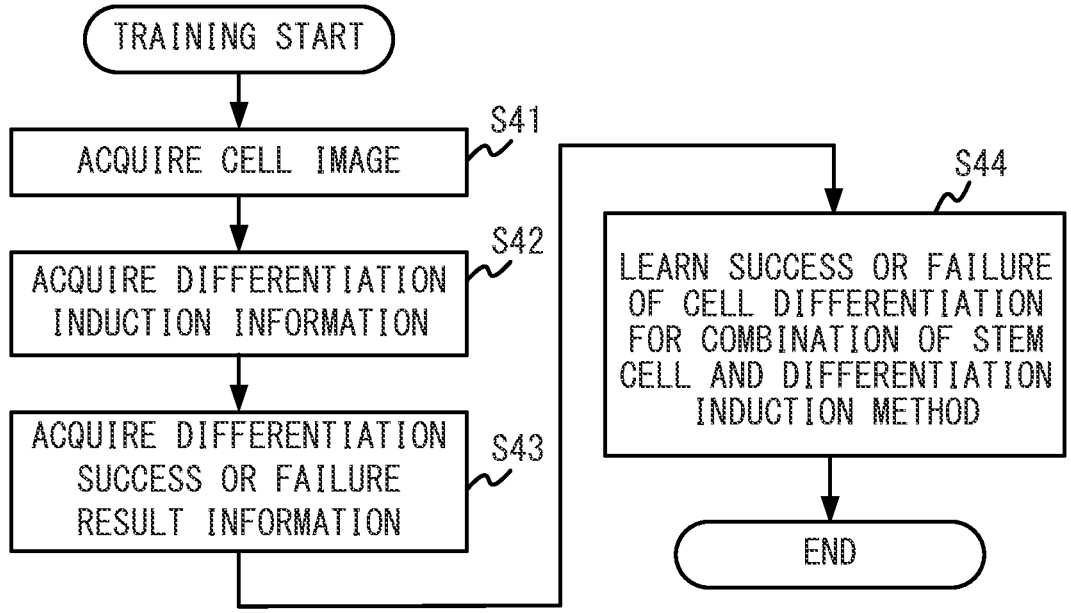
FIG. 8 is an example of a flowchart of training processing according to the first embodiment.

FIG. 7 is an example of a flowchart illustrating the training procedure of the machine learned model according to the present embodiment. FIG. 8 is an example of a flowchart of training processing according to the present embodiment. A learning method of the machine learned model used for cell evaluation in the system 1 will be described with reference to FIGS. 7 and 8. Note that, hereinafter, a case where the training procedure illustrated in FIGS. 7 and 8 is performed using the system 1 will be described as an example, but the training procedure illustrated in FIGS. 7 and 8 may be performed using the system 1 or may be performed using a system different from the system 1.

Also in a learning process, first, a user of the system 1 produces a stem cell to be induced to differentiate (step S31), and then the microscope device 10 photographs the stem cell prepared in step S31 (step S32). This processing is similar to processing in steps S21 and S22 in the procedure for culturing illustrated in FIG. 4. Therefore, a cell image generated in step S32 is, for example, a phase contrast image.

Thereafter, the user administers a differentiation inducing agent (differentiation inducing factor) to the stem cell (step S33), and observes the stem cell while continuing the culturing of the stem cell (step S34). This processing is similar to processing in steps S15 and S16 in the procedure for culturing illustrated in FIG. 4.

Then, when the culturing ends, the computer 20 performs training processing illustrated in FIG. 8 (step S35). Here, the computer 20 first acquires a target cell image, differentiation induction information, and differentiation success or failure result information (steps S41 to S43). Note that the target cell image is the image generated in step S32. The differentiation induction information includes information related to the differentiation inducing agent administered in step S33, and the computer 20 acquires, for example, information input by the user using the input device 23 as the differentiation induction information. The differentiation success or failure result information is information related to success or failure of differentiation of the stem cell produced in step S31 obtained as a result of the culturing and observing in step S34. The differentiation success or failure result information may include information related to the type and name of a cell after differentiation.

Finally, the computer 20 learns success or failure of cell differentiation for a combination of the stem cell and the differentiation induction method (step S44), and ends the training processing illustrated in FIGS. 7 and 8. Here, the computer 20 trains a machine learning model such that the differentiation success or failure result information acquired in step S43 is output in response to input of the target cell image acquired in step S41 and the differentiation induction information acquired in step S42.

By the above training processing being performed for various combinations of a stem cell and a differentiation induction method, the machine learning model is trained, and a machine learned model that has learned success or failure of cell differentiation for the combinations of a stem cell and a differentiation induction method is constructed.

Second Embodiment

In the first embodiment, an example has been described in which a stem cell is screened before the start of differentiation induction by success or failure of differentiation of the stem cell being inferred before the differentiation induction. The present embodiment is different from the first embodiment in that success or failure of differentiation of a stem cell is continuously inferred even after the start of differentiation induction.

Figure 9:
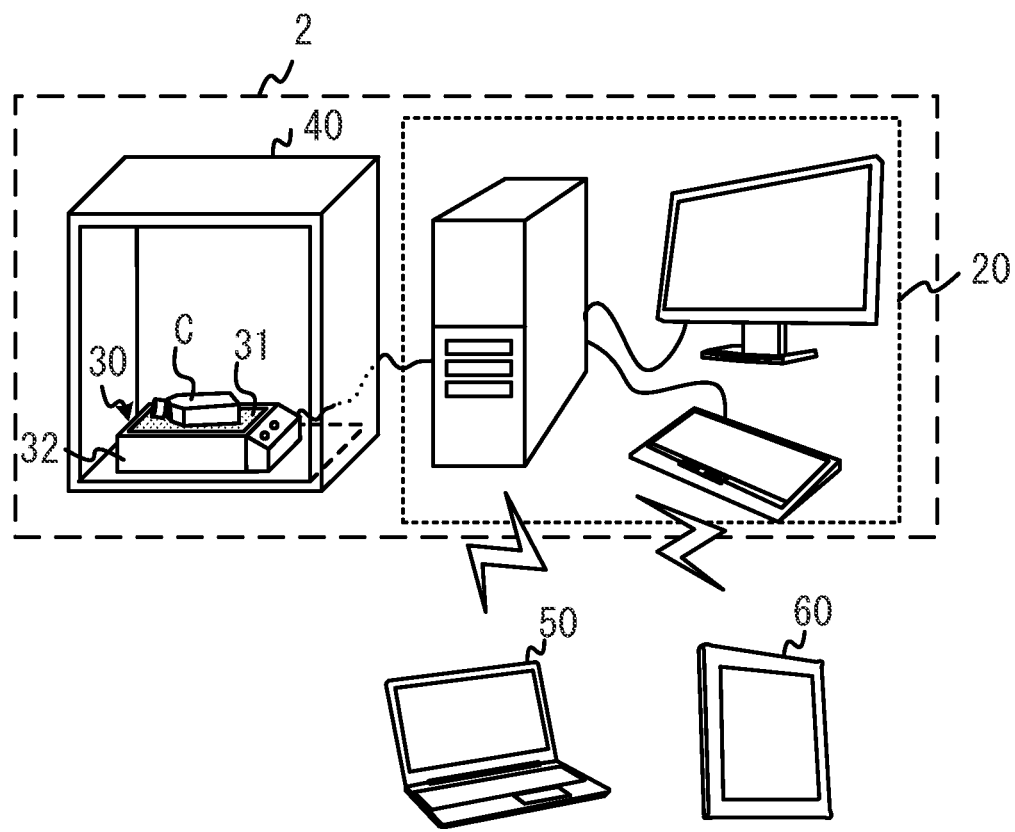
FIG. 9 is a diagram illustrating a configuration of a system according to a second embodiment.
Figure 10:
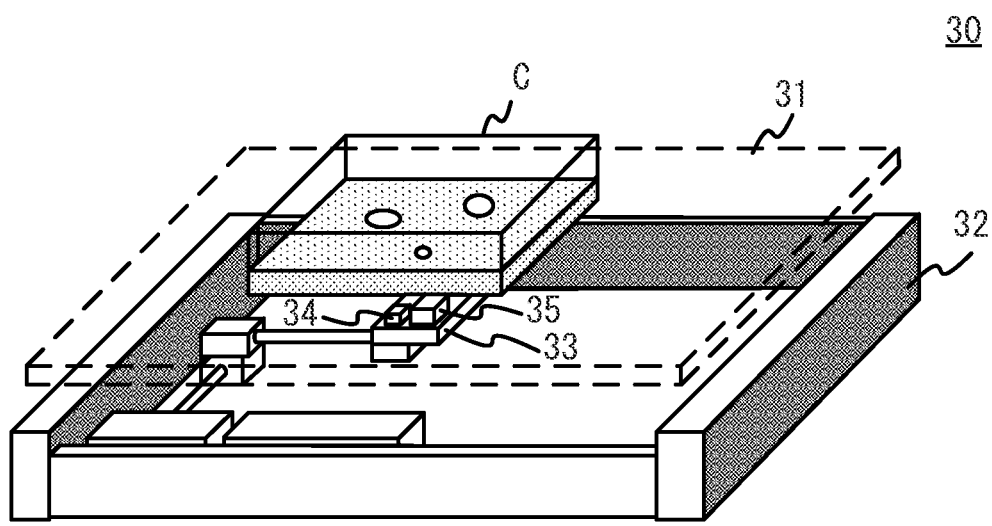
FIG. 10 is a diagram illustrating a configuration of an observation device.

Hereinafter, a system 2 according to the present embodiment will be described with reference to FIGS. 9 and 10. FIG. 9 is a diagram illustrating a configuration of the system 2 according to the present embodiment. FIG. 10 is a diagram illustrating a configuration of an observation device 30.

Similarly to the system 1, the system 2 is a system for evaluating differentiation of a stem cell. The system 2 includes the observation device 30 that photographs a stem cell and a computer 20 that evaluates differentiation of the stem cell. The system 2 is different from the system 1 in that the observation device 30 is provided instead of the microscope device 10. The computer 20 is similar to the computer 20 of the system 1. However, the computer 20 is configured to be able to communicate with terminals outside the system 2 registered in advance (terminal 50, terminal 60). The terminal 50 and the terminal 60 are, for example, personal terminals of a user, and may be a mobile phone, a smartphone, or the like.

The observation device 30 is an example of the photographing unit of the system 1 that photographs a stem cell (also referred to as a target cell) in a culture container C. The observation device 30 is similar to the microscope device 10 in photographing a target cell to generate a target cell image.

In order to observe the stem cell without taking the stem cell out from an incubator 40, the observation device 30 is used in a state of being arranged in the incubator 40, for example, as illustrated in FIG. 9, and photographs the stem cell being cultured. More specifically, the observation device 30 is arranged in the incubator 40 in a state where the culture container C is placed on a transmission window 31 of the observation device 30, and photographs the stem cell in the culture container C according to an instruction from the computer 20. By a configuration in which the stem cell can be continuously observed without being taken out from the incubator 40 being adopted, contamination associated with operations of opening and closing of the incubator 40, transportation of the stem cell, and the like can be prevented.

As illustrated in FIG. 10, the observation device 30 includes a box-shaped housing 32 having the transparent transmission window 31 on which the culture container C is arranged as an upper surface. Note that the transmission window 31 is a transparent top plate included in the upper surface of the housing 32 of the observation device 30, and is formed from, for example, glass, transparent resin, or the like. The observation device 30 further includes a light source unit 34 that is accommodated in the housing 32 and illuminates a sample, and an imaging unit 35 that acquires an image of the sample. The light source unit 34 and the imaging unit 35 are provided on a stage 33, and move with respect to the culture container C as the stage 33 moves in the housing 32. As a result, the observation device 30 can illuminate the stem cell that exists at any position in the culture container C by the light source unit 34, and can photograph the stem cell by the imaging unit 35.

Note that FIG. 10 illustrates an example in which the light source unit 34 and the imaging unit 35 are provided on the stage 33, and as a result, move integrally in the housing 32, but the light source unit 34 and the imaging unit 35 may move independently in the housing 32.

The light source unit 34 includes a light source such as an LED. The light source may include a white LED, or may include a plurality of LEDs that emit light of a plurality of different wavelengths of red (R), green (G), blue (B), and the like.

The imaging unit 35 includes an imaging element. The imaging element is a photosensor that converts detected light to an electric signal. Specifically, the imaging element is an image sensor, and is, for example, a charge-coupled device (CCD) image sensor, a complementary MOS (CMOS) image sensor, or the like, although it is not limited thereto.

In the observation device 30 configured as described above, oblique illumination is adopted in order to visualize the stem cell in the culture container C as a phase object. Specifically, light emitted from the light source unit 34 is emitted to the outside of the housing 32, and thereafter, a part of the light emitted to the outside of the housing 32 is deflected above a sample S by being reflected on, for example, the upper surface of the culture container C, and further, the sample S is irradiated with a part of the light deflected above the sample S, and the part of the light is transmitted through the sample S and the transmission window 31 to enter the housing 32. Then, a part of the light that has entered the housing 32 enters the imaging unit 35, and an image of the stem cell is formed on the imaging element. Finally, the observation device 30 generates an image of the stem cell on the basis of an electric signal output from the imaging element. As described above, the observation device 30 photographs the stem cell in a non-stained manner, generates a cell image that is a non-stained image obtained by visualizing the stem cell, and outputs the cell image to the computer 20.

The computer 20 transmits a photographing instruction to the observation device 30 placed in the incubator 40, and receives, from the observation device 30, the cell image generated by the observation device 30 according to the photographing instruction. The computer 20 transmits a photographing instruction to the observation device 30 according to a predetermined schedule, so that the observation device 30 performs time-lapse photographing. As a result, in the system 2, a temporal change of the stem cell can be observed without the stem cell being cultured being taken out from the incubator 40.

Figure 11:
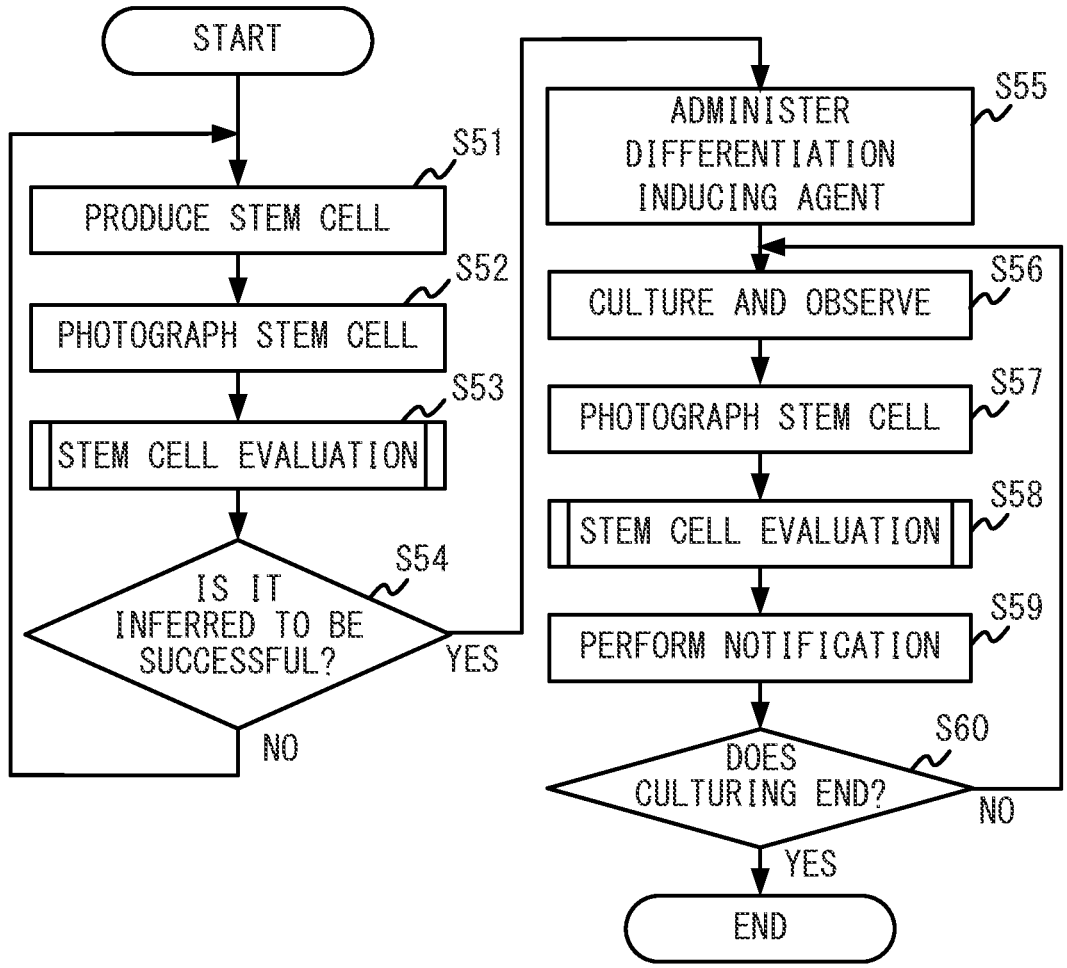
FIG. 11 is an example of a flowchart illustrating a procedure for culturing a stem cell according to the second embodiment.
Figure 12:
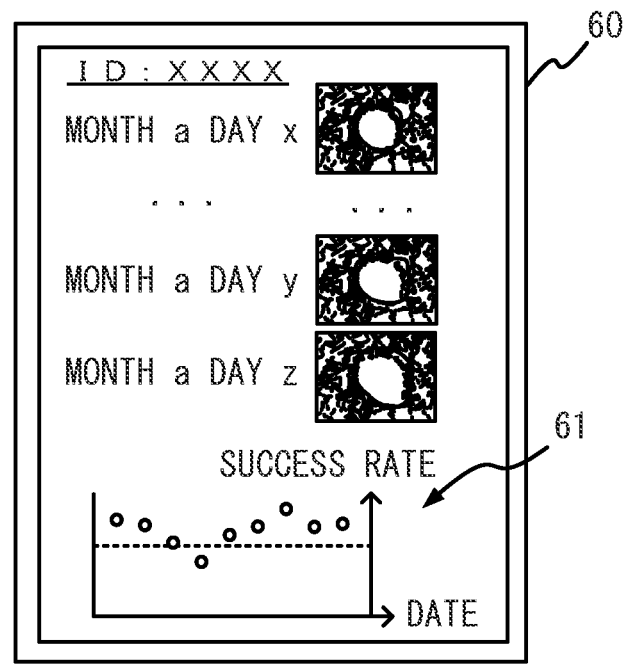
FIG. 12 is an example of an application screen displayed on a terminal.

FIG. 11 is an example of a flowchart illustrating a procedure for culturing a stem cell according to the present embodiment. FIG. 12 is an example of an application screen displayed on a terminal. Hereinafter, the procedure for culturing a stem cell in time-lapse photographing performed using the system 2 will be described with reference to FIGS. 11 and 12.

In the procedure for culturing a stem cell according to the present embodiment, processing from step S51 to step S56 is similar to processing from step S11 to step S16 in the procedure for culturing according to the first embodiment.

Thereafter, the observation device 30 photographs a stem cell produced in step S51 (step S57), and the computer 20 performs stem cell evaluation processing (step S58). Note that processing in steps S57 and S58 is similar to that in steps S52 and S53. That is, in step S58, the computer 20 updates differentiation success or failure information of the stem cell (target cell) at any time on the basis of a target cell image output from the microscope device 10 by time-lapse photographing, differentiation induction information, and a machine learned model 22a stored in a storage device 22.

As described above, in the system 2, a stem cell is continuously photographed even after a differentiation inducing agent is administered and differentiation induction is started, and success or failure of differentiation of the stem cell is continuously evaluated from a generated cell image. For this reason, a case where, although a stem cell itself has high differentiation potency, differentiation is inferred to fail due to an external factor such as a culturing environment can also be detected.

Furthermore, the computer 20 notifies a terminal registered in advance of the differentiation success or failure information updated in step S58 (step S59). Here, the computer 20 may notify a terminal outside the system 2 that is, for example, a mobile terminal owned by a user (for example, terminal 50 and terminal 60 illustrated in FIG. 9) of the differentiation success or failure information. In addition to the differentiation success or failure information, the computer 20 may transmit the cell image generated in step S57 to the terminal of the user. Note that, in the system 2, processing from step S57 to step S59 is repeatedly performed until the culturing ends (step S60 YES). By the notification of the cell image and the differentiation success or failure information, an operator can remotely monitor success or failure of differentiation and the culturing status of the stem cell even if the operator is not in the culturing place.

As described above, in the system 2 according to the present embodiment, by the cell evaluation processing illustrated in FIG. 5 being performed before the start of differentiation induction, a stem cell having a low probability of differentiation success, that is, a stem cell having low differentiation potency can be distinguished similarly to the system 1. Furthermore, by the cell evaluation processing being continuously performed even after the start of differentiation induction, a case where a stem cell having high differentiation potency is inferred to fail to differentiate due to a subsequent factor such as a culturing environment can also be detected at an early stage. Therefore, according to the system 2, useless culturing in which differentiation fails can be further reduced as compared with the system 1, and desired cells can be obtained from a stem cell in a short time and at low cost.

Although an example in which newest differentiation success or failure information is transmitted to a terminal each time differentiation of a stem cell is evaluated has been described above, the computer 20 may transmit differentiation success or failure information to a terminal only in a case where the differentiation success or failure information satisfies a predetermined condition. For example, differentiation success or failure information may be transmitted to a terminal in a case where an inference result of differentiation success or failure changes from success to failure.

Furthermore, although an example in which newest differentiation success or failure information and a cell image is transmitted to a terminal each time differentiation of a stem cell is evaluated has been described, the terminal may present a temporal change of the stem cell to a user on the basis of these pieces of information. For example, as illustrated in FIG. 12, the terminal 60 may display cell images acquired at different times side by side on the basis of information from the computer 20, and may display transition of an inferred success rate as a graph 61. By a temporal change of a stem cell being presented to a user on the basis of a plurality of pieces of differentiation success or failure information, abnormality of the stem cell that is difficult to be determined from one piece of differentiation success or failure information can be detected at an early stage. For this reason, measures such as re-culturing at an early stage or taking measures before the abnormality gets serious can be taken.

Third Embodiment

In the first embodiment and the second embodiment, an example of using a machine learned model for inferring success or failure of differentiation of a stem cell has been described. The present embodiment is different from the first embodiment and the second embodiment in that the reason for differentiation failure is inferred in addition to success or failure of differentiation of a stem cell using a machine learned model.

In a system according to the present embodiment, in addition to a machine learned model 22a that has learned success or failure of cell differentiation for combinations of a stem cell and a differentiation induction method described above (hereinafter, the machine learned model is also referred to as a first machine learned model as necessary), a machine learned model that has learned reasons for failure of cell differentiation for combinations of a temporal change of a stem cell and a differentiation induction method (hereinafter, the machine learned model is also referred to as a second machine learned model as necessary) is stored in a storage device 22. This system is different from the system 2 in that these machine learned models are used in cell evaluation processing. The other points are similar to those of the system 2.

Figure 13:
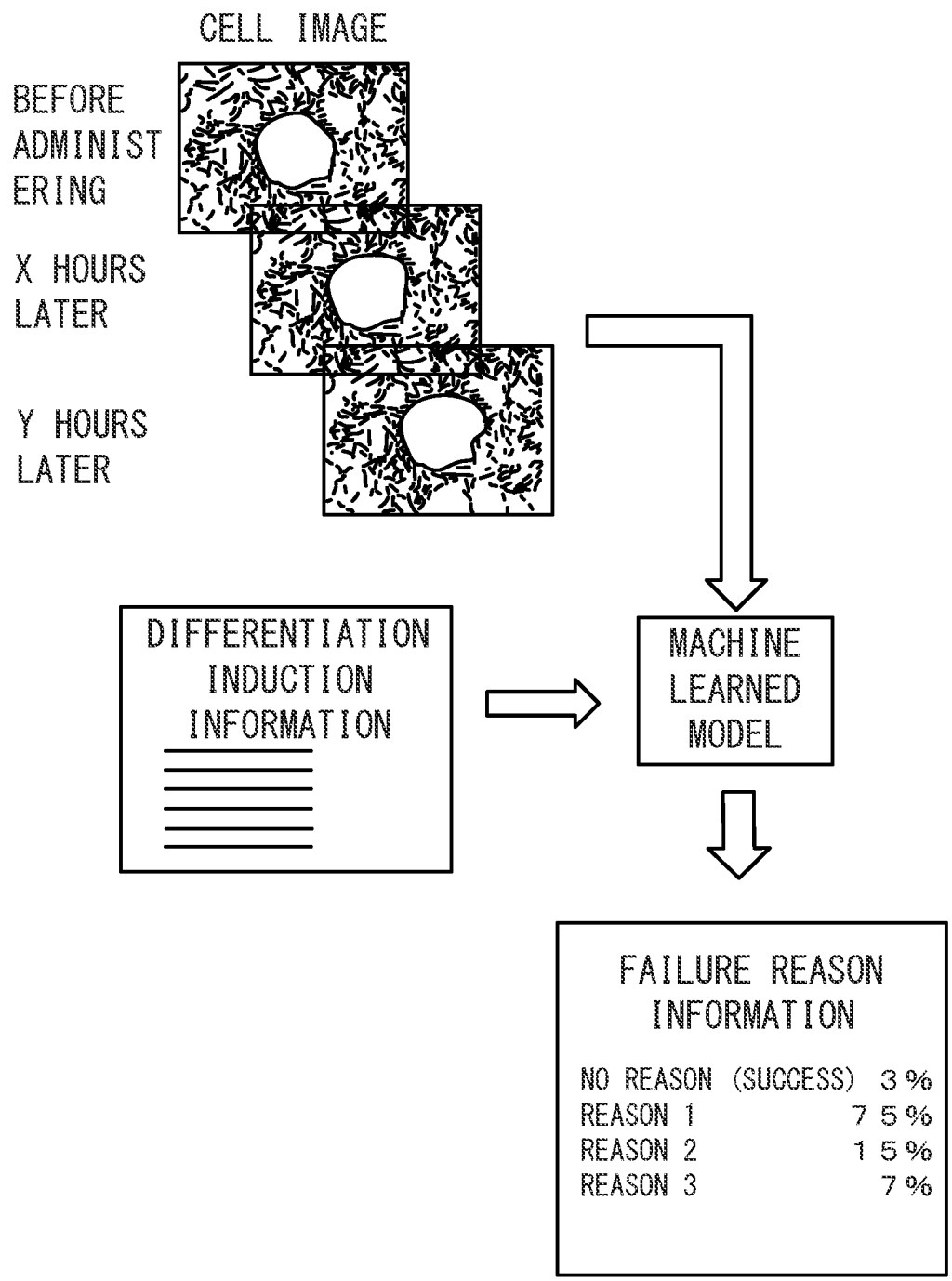
FIG. 13 is a diagram for describing input and output of a machine learned model according to a third embodiment.

FIG. 13 is a diagram for describing input and output of the second machine learned model. In the system according to the present embodiment, in the cell evaluation processing of step S58 illustrated in FIG. 11, a computer 20 infers the reason for failure of differentiation of a target cell on the basis of a plurality of target cell images obtained by photographing at different times, differentiation induction information, and the second machine learned model. More specifically, as illustrated in FIG. 13, the computer 20 inputs a plurality of target cell images obtained by time-lapse photographing and differentiation induction information to the second machine learned model, thereby acquiring failure reason information indicating an inference result of the failure reason of differentiation of the target cell by the second machine learned model. Note that the failure reason information may be information indicating a single failure reason, or may be probabilities of a plurality of respective failure reasons as illustrated in FIG. 13. Note that the failure reason in a case where differentiation is inferred to be successful may be "no failure reason".

As described above, in the system according to the present embodiment, the reason for differentiation failure is presented to a user in addition to success or failure of differentiation. Therefore, in a case where differentiation is inferred to fail, the culturing can be stopped at an early stage, and a new stem cell can be cultured. Furthermore, since the probability of repeating the same failure in culturing a new stem cell is reduced by the reason for differentiation failure being presented, the probability that differentiation fails after the start of differentiation induction can be reduced. Therefore, even by the system according to the present embodiment, desired cells can be obtained from a stem cell in a short time and at low cost.

Figure 14:
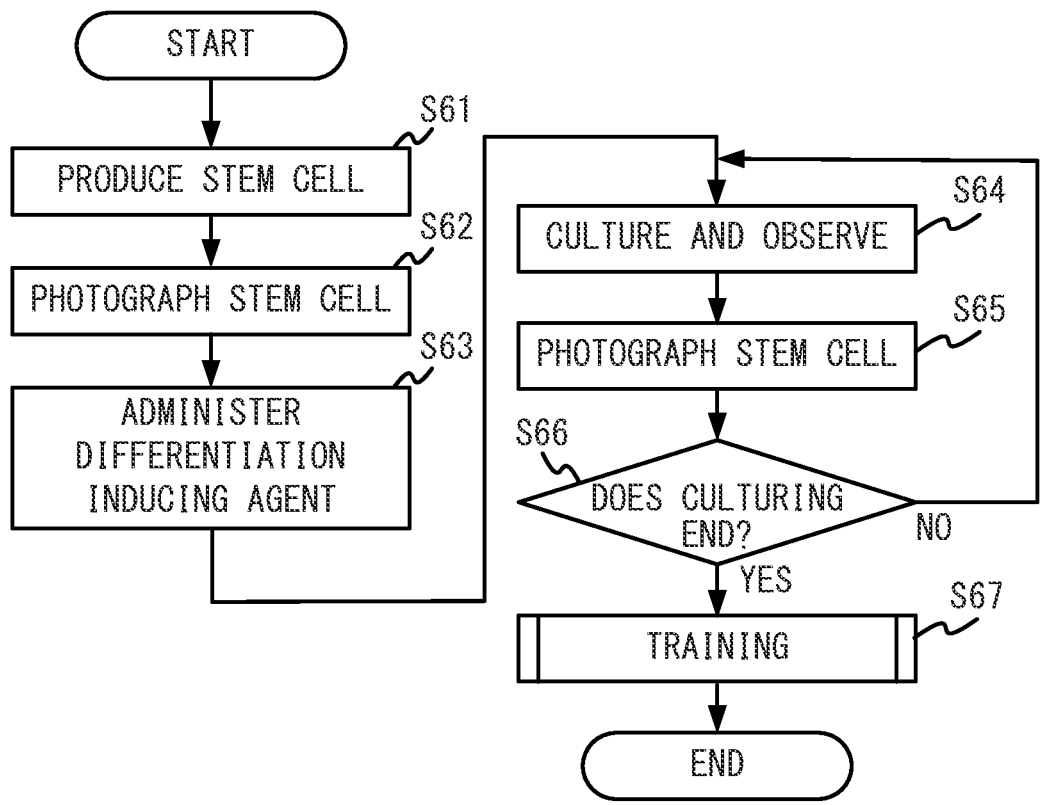
FIG. 14 is an example of a flowchart illustrating a training procedure of the machine learned model according to the third embodiment.
Figure 15:
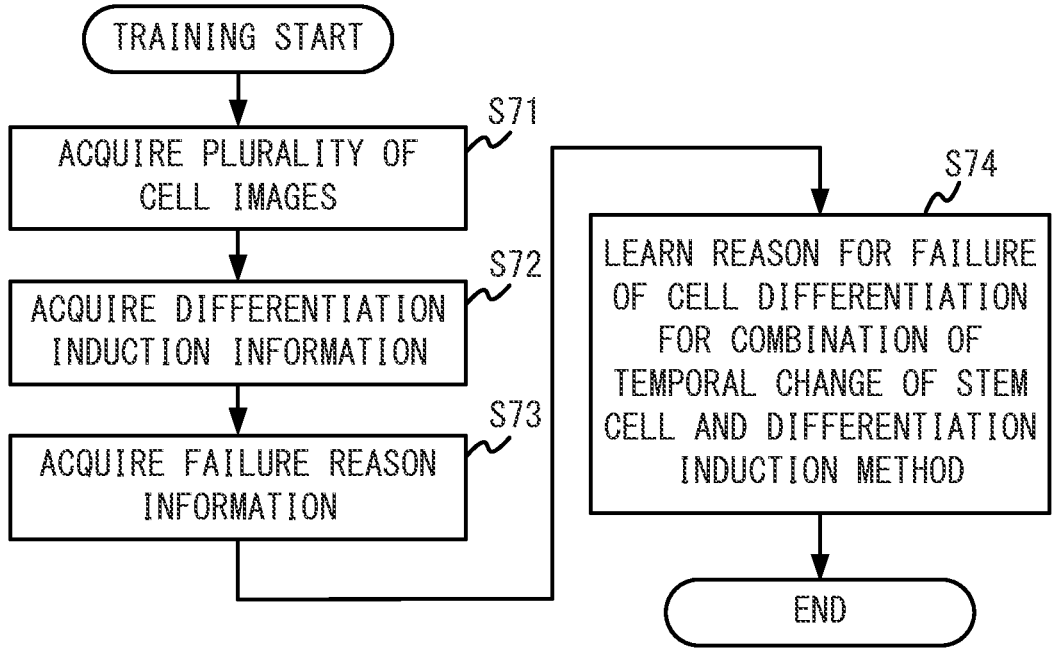
FIG. 15 is an example of a flowchart of training processing according to the third embodiment.

FIG. 14 is an example of a flowchart illustrating a training procedure of the machine learned model according to the present embodiment. FIG. 15 is an example of a flowchart of training processing according to the present embodiment. The learning method of the second machine learned model among the machine learned models used for cell evaluation in the system according to the present embodiment will be described with reference to FIGS. 14 and 15.

Processing from step S61 to step S64 in a learning process illustrated in FIG. 14 is similar to processing from step S31 to step S34 in the learning process of the first machine learned model illustrated in FIG. 7.

Thereafter, until the culturing ends (step S66 YES), photographing of a stem cell by an observation device 30 (step S65) and the culturing and observing by a user (step S64) are repeated. Then, when the culturing ends, the computer 20 performs the training processing illustrated in FIG. 15 (step S67). Here, the computer 20 first acquires a plurality of target cell images, differentiation induction information, and failure reason information (steps S71 to S73). Note that the plurality of target cell images are images generated in steps S62 and S65. The differentiation induction information includes information related to a differentiation inducing agent administered in step S63, and the computer 20 acquires, for example, information input by the user using an input device 23 as the differentiation induction information. The failure reason information is information related to the reason why differentiation has failed that is input by the user using the input device 23 at the end of culturing. Specifically, the failure reason information indicates, for example, that medium replacement is not appropriately performed, a setting of the environmental temperature is not appropriate, the timing and amount of a differentiation inducing agent are not appropriate, and the like.

Finally, the computer 20 learns the reason for failure of cell differentiation for a combination of the temporal change of the stem cell and the differentiation induction method (step S74), and ends the training processing illustrated in FIGS. 14 and 15. Here, the computer 20 trains a machine learning model such that the failure reason information acquired in step S73 is output in response to input of the target cell images acquired in step S71 and the differentiation induction information acquired in step S72.

By the above training processing being performed for various combinations of a stem cell and a differentiation induction method, the machine learning model is trained, and a machine learned model that has learned failure reasons for cell differentiation for combinations of a temporal change of a stem cell and a differentiation induction method is constructed.

Fourth Embodiment

In the first embodiment and the second embodiment, an example of using a machine learned model for inferring success or failure of differentiation of a stem cell has been described. The present embodiment is different from the first embodiment and the second embodiment in that the shape of a differentiated cell is inferred in addition to success or failure of differentiation of a stem cell using a machine learned model. Note that the shape of a differentiated cell is more precisely the shape of a cell after differentiation. Furthermore, the shape of a cell is not limited to the shape of a single cell, and may be the shape of a colony including cells. That is, the shape of a cell may be the aggregate shape of one or more cells.

In a system according to the present embodiment, in addition to a machine learned model 22a that has learned success or failure of cell differentiation for combinations of a stem cell and a differentiation induction method described above (hereinafter, the machine learned model is also referred to as a first machine learned model as necessary), a machine learned model that has learned the shape of a cell differentiated from a stem cell for combinations of a stem cell and a differentiation induction method (hereinafter, the machine learned model is also referred to as a third machine learned model as necessary) is stored in a storage device 22. This system is different from the system 1 in that these machine learned models are used in cell evaluation processing. The other points are similar to those of the system 1.

Figure 16:
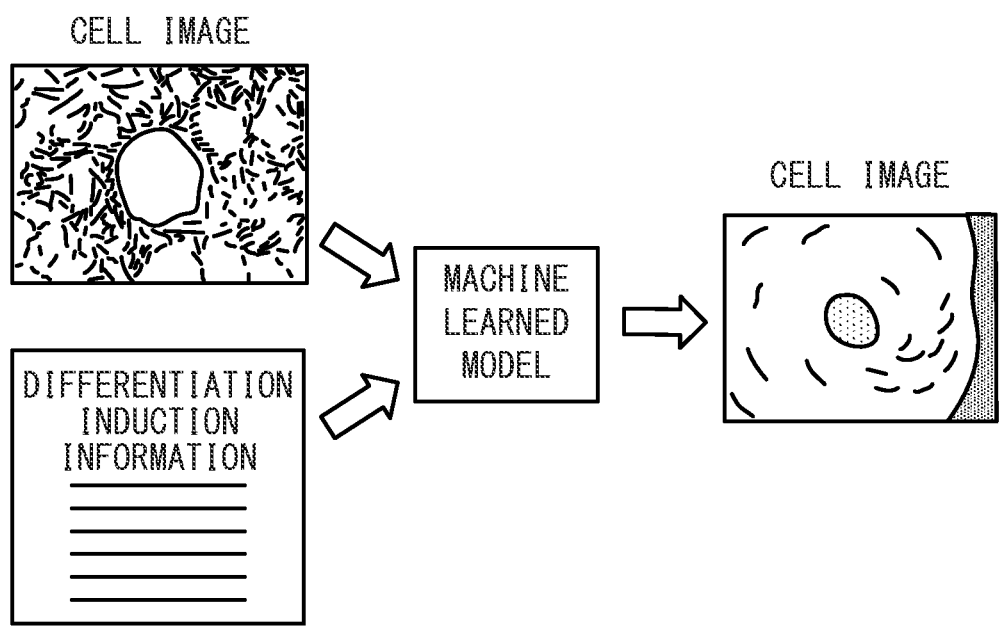
FIG. 16 is a diagram for describing input and output of a machine learned model according to a fourth embodiment.

FIG. 16 is a diagram for describing input and output of the third machine learned model. In the system according to the present embodiment, in the cell evaluation processing of step S13 illustrated in FIG. 4, a computer 20 infers the shape of a cell differentiated from a target cell on the basis of a target cell image, differentiation induction information, and the third machine learned model. More specifically, as illustrated in FIG. 16, the computer 20 inputs the target cell image and the differentiation induction information to the third machine learned model, thereby acquiring shape information indicating an inference result related to the shape of a cell differentiated from the target cell by the third machine learned model. Note that the shape information may be image information, and for example, image information in the same format as an input cell image (cell image). Furthermore, the shape information may be numerical information such as an internal angle or roundness that can be quantitatively evaluated. Moreover, the shape information may be a combination of the image information and the numerical information, or the numerical information and the image information may be displayed together.

As described above, in the system according to the present embodiment, the shape of a cell after differentiation is presented to a user in addition to success or failure of differentiation. As a result, the state of a cell after differentiation can be more specifically recognized. As a result, in a case where determining whether to continue culturing on the basis of an inference result of success or failure of differentiation is difficult, an additional determination material can be used. Therefore, even by the system according to the present embodiment, desired cells can be obtained from a stem cell in a short time and at low cost.

Figure 17:
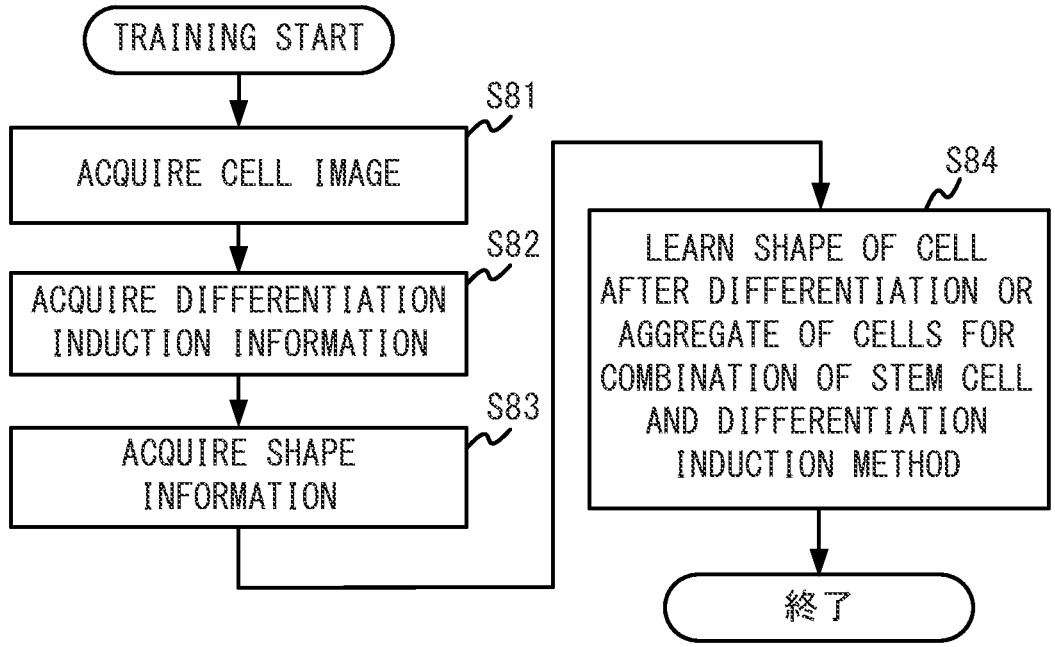
FIG. 17 is an example of a flowchart of training processing according to the fourth embodiment.

FIG. 17 is an example of a flowchart of training processing according to the present embodiment. A learning method of the third machine learned model among the machine learned models used for cell evaluation in the system according to the present embodiment will be described with reference to FIG. 17.

A learning process of the third machine learned model is different from the learning process of the first machine learned model illustrated in FIG. 7 in that the training processing illustrated in FIG. 17 is performed instead of the training processing illustrated in FIG. 8.

In the training processing illustrated in FIG. 17, the computer 20 first acquires a target cell image, differentiation induction information, and shape information (steps S81 to S83). Note that the target cell image is the image generated in step S32 in FIG. 7. The differentiation induction information includes information related to the differentiation inducing agent administered in step S33, and the computer 20 acquires, for example, information input by the user using the input device 23 as the differentiation induction information. The shape information may be, for example, a cell image at the end of culturing, or annotation information added by a user to the cell image at the end of the culturing.

Finally, the computer 20 learns the shape of a cell differentiated from a stem cell for a combination of a stem cell and a differentiation induction method (step S84), and ends the training processing illustrated in FIG. 17. Here, the computer 20 trains a machine learning model such that the shape information acquired in step S83 is output in response to input of the target cell image acquired in step S81 and the differentiation induction information acquired in step S82.

By the above training processing being performed for various combinations of a stem cell and a differentiation induction method, the machine learning model is trained, and a machine learned model that has learned the shapes of cells differentiated from stem cells for combinations of a stem cell and a differentiation induction method is constructed.

Fifth Embodiment

Figure 18:
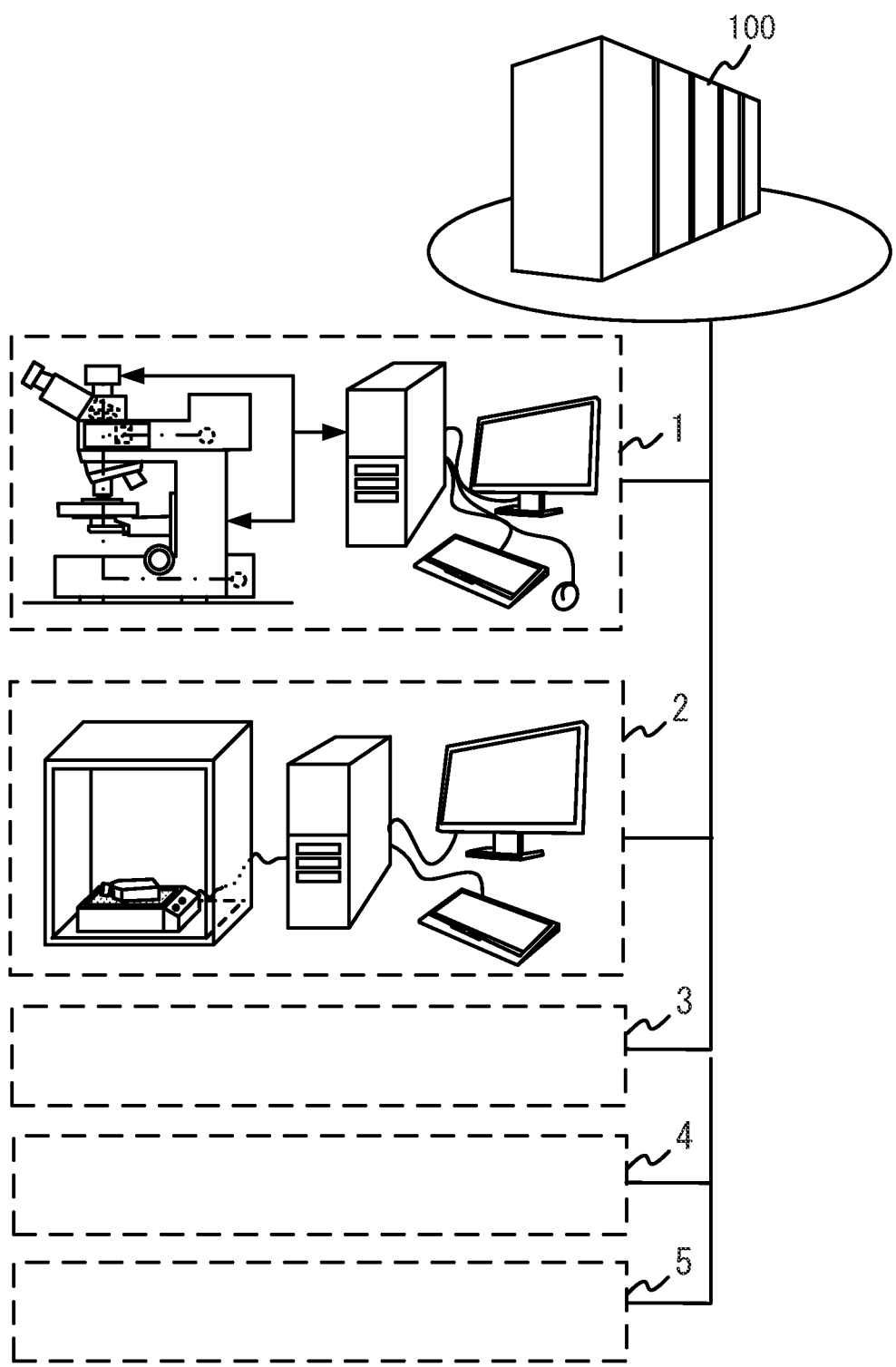
FIG. 18 is a diagram illustrating a configuration of a system according to a fifth embodiment.

In the first embodiment and the second embodiment, a single system including the computer 20 and a photographing device (microscope device 10, observation device 30) is exemplified, but the system for evaluating cell differentiation may be, for example, a system in which a plurality of systems each functioning independently is connected to each other via a network as illustrated in FIG. 18, or may include a cloud server arranged on the network and accessible from all the systems.

FIG. 18 is a diagram illustrating a configuration of a system according to the present embodiment. The system according to the present embodiment includes a plurality of systems that function individually (system 1, system 2, system 3, system 4, system 5, . . . , hereinafter, referred to as a subsystem in order to distinguish from the entire system) and a server 100 accessible from the plurality of subsystems. Note that each of the subsystems is provided at, for example, a company's office, a laboratory, or the like.

Similarly to each of the subsystems, the server 100 includes, for example, a storage device in which a first machine learned model, a second machine learned model, and a third machine learned model described above are stored. The server 100 receives learning data from each of the subsystems. Learned models stored in the storage device of the server 100 are machine learned models that have learned using various types of learning data received from all the subsystems, whereas machine learned models stored in a storage device of each of the subsystems are machine learned models that have learned using learning data obtained in each of the subsystems.

Stem cells and differentiation induction methods used in specific offices and laboratories where the subsystems are placed are similar. Therefore, in each of the subsystems, stem cells and differentiation induction methods that are usually used can be inferred with high accuracy using the machine learned models. On the other hand, in the server 100, since learning is performed using various types of learning data, machine learned models having high versatility are constructed, and various combinations of a stem cell and a differentiation induction method can be coped with, but the accuracy of inference for a specific combination may be inferior to that of the subsystems.

In the present embodiment, each of the subsystems performs inference using the machine learned models in the each of the subsystems for an already learned combination of a stem cell and a differentiation induction method, and entrusts cell evaluation to the server 100 for an unknown combination. In this way, inference having a certain degree or more of accuracy can be performed for any combination while inference having high accuracy is performed for a combination usually used.

The embodiments described above are specific examples for facilitating understanding of the invention, and thus the present invention is not limited to the embodiments. Modifications obtained by modifying the above embodiments and alternative forms replacing the above embodiments can be included. In other words, in each embodiment, the components can be modified without departing from the spirit and the scope thereof. Further, a new embodiment can be implemented by appropriately combining the multiple components disclosed in one or more of the embodiments. Further, some components may be omitted from the components described in each embodiment, or some components may be added to the components described in the embodiment. Further, the order of the processing procedures in each embodiment is interchangeable as long as there is no contradiction. In other words, the system, method, and recording medium for evaluating differentiation of a stem cell of the present invention can be variously modified and changed without departing from the scope of the invention defined by the claims.

Herein, the expression of "on the basis of A" does not indicate "only on the basis of A", but indicates "at least on the basis of A", and further indicates "at least partially on the basis of A". That is, "on the basis of A" may be on the basis of B in addition to A or on the basis of a part of A.

Herein, the terms "first", "second", and the like that modify a noun do not limit the amount or order of an element represented by the noun. These terms are used to distinguish between two or more elements, and are nothing more nor less than it. Therefore, specifying "first" and "second" elements does not mean that the "first" element precedes the "second" element, nor does it negate the existence of a "third" element.

What is claimed is:

1. A system for evaluating stem cell differentiation, comprising:
    a storage configured to store a machine learned model that has learned success or failure of cell differentiation into a desired cell type for a combination of a stem cell and a differentiation induction method, including differentiation induction information;
    an acquisition unit configured to acquire a target cell image that is an image of a target cell that is a stem cell to be induced to differentiate and the differentiation induction information that is information related to the differentiation induction method applied to the target cell; and
    a processor configured to output differentiation success or failure information indicating an inference result related to success or failure of differentiation of the target cell into the desired cell type on a basis of the target cell image and the differentiation induction information acquired by the acquisition unit and the machine learned model stored in the storage, wherein
    the differentiation induction information comprises information indicating a type of a stimulus given to the target cell.

2. The system according to claim 1, wherein
the differentiation induction information further comprises information related to timing at which the stimulus is given.

3. The system according to claim 1, wherein
the differentiation induction information further comprises information related to a differentiation inducing factor that is caused to act on the target cell.

4. The system according to claim 3, wherein
the differentiation induction information further comprises information related to timing at which the differentiation inducing factor is caused to act.

5. The system according to claim 1, wherein
the target cell image is a non-stained image obtained by photographing the target cell in a non-stained manner.

6. The system according to claim 1, further comprising
a photographing unit configured to photograph the target cell in order to acquire the target cell image.

7. The system according to claim 6, wherein
the photographing unit is
arranged in an incubator and
configured to photograph the target cell being cultured in the incubator.

8. The system according to claim 6, wherein
the photographing unit is configured to perform time-lapse photographing, and
the processor is configured to update the differentiation success or failure information on a basis of the target cell image output from the photographing unit by the time-lapse photographing, the differentiation induction information, and the machine learned model stored in the storage.

9. The system according to claim 8, further comprising
a communication device configured to notify a terminal registered in advance of the updated differentiation success or failure information.

10. The system according to claim 1, wherein
the storage is configured to further store a second machine learned model that has learned a failure reason for cell differentiation for a combination of a temporal change of a stem cell and a differentiation induction method, and
the processor is configured to output failure reason information indicating an inference result of a failure reason for differentiation of the target cell on a basis of a plurality of the target cell images that are images of the target cell obtained by photographing at different times, the differentiation induction information, and the second machine learned model stored in the storage.

11. The system according to claim 1, wherein
the storage is configured to further store a third machine learned model that has learned a shape of a cell differentiated from the stem cell for a combination of a stem cell and a differentiation induction method, and
the processor is configured to output shape information indicating an inference result of a shape of a cell differentiated from the target cell on a basis of the target cell image and the differentiation induction information acquired by the acquisition unit and the third machine learned model stored in the storage.

12. The system according to claim 11, wherein
the shape information comprises an inferred cell image indicating an inference result of a shape of a cell differentiated from the target cell.

13. The system according to claim 1, wherein
the target cell is an undifferentiated cell.

14. The system according to claim 1, wherein
the differentiation success or failure information comprises cell type information indicating a cell type after the target cell differentiates.

15. The system of claim 1 wherein the differentiation induction information comprises information related to a differentiation inducing factor that is caused to act on the target cell and wherein the differentiation inducing factor comprises a compound, a gene introduced into the stem cell, or a physical stimulus.

16. A method for evaluating stem cell differentiation, comprising:
    acquiring a target cell image that is an image of a target cell that is a stem cell to be induced to differentiate and differentiation induction information that is information related to a differentiation induction method applied to the target cell; and
    outputting differentiation success or failure information indicating an inference result related to success or failure of differentiation of the target cell into a desired cell type on a basis of the target cell image and the differentiation induction information that are acquired, and a machine learned model that has learned success or failure of cell differentiation for a combination of a stem cell and a differentiation induction method, wherein the differentiation induction information comprises information indicating a type of a stimulus given to the target cell.

17. The method of claim 16 wherein the differentiation induction information comprises information related to a differentiation inducing factor that is caused to act on the target cell and wherein the differentiation inducing factor comprises a compound, a gene introduced into the stem cell, or a physical stimulus.

18. A non-transitory computer-readable recording medium that has recorded a program for causing a computer to perform processing comprising following processing:

acquiring a target cell image that is an image of a target cell that is a stem cell to be induced to differentiate and differentiation induction information that is information related to a differentiation induction method applied to the target cell; and outputting differentiation success or failure information indicating an inference result related to success or failure of differentiation of the target cell into a desired cell type on a basis of the target cell image and the differentiation induction information that are acquired, and a machine learned model that has learned success or failure of cell differentiation for a combination of a stem cell and a differentiation induction method, wherein the differentiation induction information comprises information indicating a type of a stimulus given to the target cell.

19. The non-transitory computer-readable recording medium of claim 18 wherein the differentiation induction information comprises information related to a differentiation inducing factor that is caused to act on the target cell and wherein the differentiation inducing factor comprises a compound, a gene introduced into the stem cell, or a physical stimulus.

* * * * *